(12) United States Patent
Didomenico et al.

(10) Patent No.: US 9,734,797 B2
(45) Date of Patent: Aug. 15, 2017

(54) SELECTIVELY ADJUSTING DISPLAY PARAMETER OF AREAS WITHIN USER INTERFACE

(71) Applicant: Crackle, Inc., Sausalito, CA (US)

(72) Inventors: Tarik Didomenico, Santa Monica, CA (US); Jose Rivera Font, Miami, FL (US); Maria Isabel Figueroa, Miami, FL (US); Juan Alejandro Silva, Playa Vista, CA (US); Victor Thompson, Santa Monica, CA (US); Eduardo Arias, Miami, FL (US)

(73) Assignee: CRACKLE, INC., Culver City, CA (US)

( * ) Notice: Subject to any disclaimer, the term of this patent is extended or adjusted under 35 U.S.C. 154(b) by 466 days.

(21) Appl. No.: 14/226,703

(22) Filed: Mar. 26, 2014

(65) Prior Publication Data

US 2015/0046823 A1    Feb. 12, 2015

Related U.S. Application Data

(60) Provisional application No. 61/862,897, filed on Aug. 6, 2013.

(51) Int. Cl.
| | |
|---|---|
| *G09G 5/14* | (2006.01) |
| *G06F 3/0481* | (2013.01) |
| *G06F 3/0484* | (2013.01) |
| *G06F 1/32* | (2006.01) |

(52) U.S. Cl.
CPC ............. *G09G 5/14* (2013.01); *G06F 1/3203* (2013.01); *G06F 1/3206* (2013.01); *G06F 1/3212* (2013.01); *G06F 3/0481* (2013.01); *G06F 3/0484* (2013.01); *G06F 3/04847* (2013.01); *G06F 2203/04804* (2013.01); (Continued)

(58) Field of Classification Search
CPC ......... G06F 2203/04804; G06F 3/0481; G06F 1/3203; G06F 1/3206; G06F 1/3212; G09G 2320/0613; G09G 2320/0626; G09G 2340/125; G09G 2340/144; G09G 5/14
See application file for complete search history.

(56) References Cited

U.S. PATENT DOCUMENTS

| | | | |
|---|---|---|---|
| 8,443,297 B1 * | 5/2013 | Jitkoff et al. | 715/795 |
| 9,112,466 B1 * | 8/2015 | Koh et al. | |
| 2002/0097210 A1 * | 7/2002 | Lonoce et al. | 345/87 |

(Continued)

*Primary Examiner* — Ting Lee

(74) *Attorney, Agent, or Firm* — Procopio, Cory, Hargreaves & Savitch LLP

(57) ABSTRACT

Controlling a user interface in a computer system, including: displaying a window in a user interface displayed on a display device, wherein the window includes a player section and a non-player section, and the non-player section is displayed according to a display parameter at a standard level, wherein the standard level is a first level as set in a device setting for the display parameter; receiving a play command for content; changing the display parameter for the non-player section of the window to a playback level, wherein the playback level is a second level for the display parameter that is different than the first level; displaying the non-player section of the window according to the playback level of the display parameter; and displaying the content in the player section of the window. Key words include display parameter and playback level.

17 Claims, 4 Drawing Sheets

(52) U.S. Cl.
CPC ............ *G09G 2320/0613* (2013.01); *G09G 2320/0626* (2013.01); *G09G 2340/125* (2013.01); *G09G 2360/144* (2013.01)

(56) References Cited

U.S. PATENT DOCUMENTS

| | | | |
|---|---|---|---|
| 2007/0022389 A1* | 1/2007 | Ording et al. | 715/790 |
| 2007/0061761 A1* | 3/2007 | Lee et al. | 715/859 |
| 2008/0276192 A1* | 11/2008 | Jones et al. | 715/772 |
| 2012/0299941 A1* | 11/2012 | Lee et al. | 345/582 |
| 2013/0061180 A1* | 3/2013 | Dongen et al. | 715/847 |
| 2014/0178028 A1* | 6/2014 | Park et al. | 386/201 |
| 2014/0314302 A1* | 10/2014 | Minato | G06T 7/0004 382/141 |

* cited by examiner

SELECTIVELY ADJUSTING DISPLAY PARAMETER OF AREAS WITHIN USER INTERFACE

CROSS-REFERENCE TO RELATED APPLICATIONS

This application claims the benefit of priority under 35 U.S.C. §119(e) of U.S. Provisional Patent Application No. 61/862,897, filed Aug. 6, 2013, entitled "User Interface Dimming". The disclosure of the above-referenced application is incorporated herein by reference.

BACKGROUND

Field of the Invention

The present invention relates to a user interface, and more specifically, to selectively adjusting a user interface and areas around a presentation area displayed on a computer system.

Background

The concept of adapting ambient light with a video display of devices such as television exists to enhance viewing experience of viewers. In this concept, the ambient light may be adjusted to blend with color and hue of the video display.

SUMMARY

The present invention provides for selectively adjusting a display parameter of areas within a user interface.

In one implementation, a method for controlling a user interface in a computer system is disclosed. The method includes: displaying a window in a user interface displayed on a display device, wherein the window includes a player section and a non-player section, and the non-player section is displayed according to a display parameter at a standard level, wherein the standard level is a first level as set in a device setting for the display parameter; receiving a play command for content; changing the display parameter for the non-player section of the window to a playback level, wherein the playback level is a second level for the display parameter that is different than the first level; displaying the non-player section of the window according to the playback level of the display parameter; and displaying the content in the player section of the window.

In another implementation, a method for controlling a user interface in a computer system is disclosed. The method includes: displaying a window in a user interface displayed on a display device, wherein the window includes a player section and a non-player section, and the non-player section is displayed according to a display parameter at a first level defined in a device setting for the display parameter; receiving a command to change the display parameter of the non-player section; changing the display parameter for the non-player section of the window to a second level that is different than the standard level; displaying the non-player section of the window according to the second level of the display parameter; and displaying the content in the player section of the window.

In another implementation, an apparatus for adjusting a user interface and an area surrounding a presentation area is disclosed. The apparatus includes: a user interface configured to display a window, wherein the window includes a player section and a non-player section, and the non-player section is displayed according to a display parameter at a standard level, wherein the standard level is a first level as set in a device setting for the display parameter; a processor configured to change the display parameter for the non-player section of the window to a playback level when a play command for content is received, wherein the playback level is a second level for the display parameter that is different than the standard level, the processor operating to display the non-player section of the window according to the playback level of the display parameter and to display the content in the player section of the window.

In another implementation, a non-transitory storage medium storing a computer program to control a user interface is disclosed. The computer program includes executable instructions that cause the computer to: display a window in a user interface, wherein the window includes a player section and a non-player section, and the non-player section is displayed according to a display parameter at a standard level, wherein the standard level is a first level as set in a device setting for the display parameter; receive a play command for content; change the display parameter for the non-player section of the window to a playback level, wherein the playback level is a second level for the display parameter that is different than the first level; display the non-player section of the window according to the playback level of the display parameter; and display the content in the player section of the window.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Certain implementations as disclosed herein provide for selectively adjusting a user interface and areas around a presentation area displayed on a computer system. In one implementation, a computer system provides a media application that can display and playback content. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

In one implementation, apparatus and methods to implement a technique for adjusting a user interface and the area surrounding a presentation area displayed on a computer system are disclosed. The computer system provides a media application that can display and playback content. The computer system also adjusts the display of the application and the surrounding user interface elements depending on the state of content playback. For example, in a network browser implementation, while accessing a page that contains a video player, a user initiated action dims all items but the player on the page (lights off) or re-illuminates all items on the page (lights on). Features provided in the implementations can include, but are not limited to, one or more of the following items: automated and manual adjustment of user interface brightness; automated and manual control of which elements in a user interface are affected by brightness adjustments; and automated and manual control of the conditions affecting user interface brightness adjustments.

Figure 1:
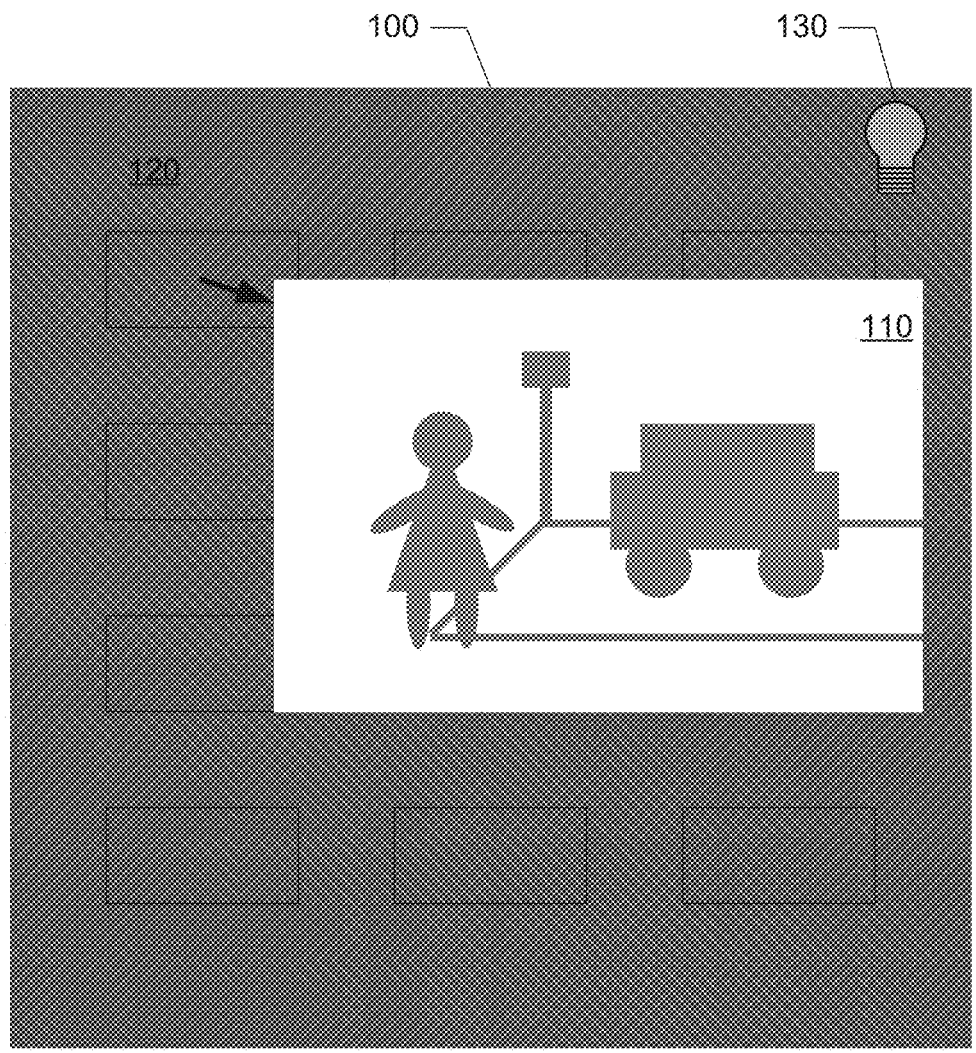
FIG. 1 illustrates an apparatus including a user interface and an area surrounding a presentation area displayed on a computer system in accordance with one implementation of the present invention.

FIG. 1 illustrates an apparatus including a user interface 100 and an area 120 surrounding a presentation area 110 displayed on a computer system in accordance with one implementation of the present invention. The apparatus also includes a processor configured to selectively adjust the brightness of different areas within a display of the computer system. For example, when viewing video (or images) on the presentation area or video window 110 (e.g., using a media player) of a computer system, a user may prefer to have the area 120 surrounding the video appear darker than the video itself. In one implementation, all items around the player window 110 are faded to black using a very dark/black transparent overlay. In another implementation, any type of opaque overlay can be used.

In one implementation, the user interface 100 of a media player software application in a computer system provides a user-initiated action to control the brightness of the area 120 surrounding the player's video window 110 (or the player window). One implementation uses a "lights on" and "lights off" feature with a light bulb icon 130 operating as an indicator and a button. The icon 130 is omnipresent in the player or the user interface (e.g., an icon on a toolbar). If lights are on, the icon 130 is in an "on" state (e.g., the light bulb image is of a bright light bulb or vice versa). If lights are off, the icon 130 is in an "off" state (e.g., the light bulb image is of a dark light bulb or vice versa). The user can click the icon button 130 as often as desired to fade the background in and out. The default setting is lights on. In another implementation, the icon 130 acts as an adjustable fader or dimmer that is activated by clicking (with a mouse interface), voice, or automatically.

One implementation provides an automatic dimming and brightening feature. For example, in addition to user-initiated actions, the user can control an "auto-dim" feature through user preferences or settings (or, e.g., at the device, account, manufacturer, provider level). The user can set the default to dimming when a video (e.g., 110) begins or based on other user actions, selections, or events (e.g., adjusting the dimming level of the user interface in response to a voice or gesture command). The user can also set the operation when playback stops or is paused (e.g., leave dark on pause, and return to original brightness when playback stops or ends). For example, if "auto-dim" is selected to be "on" in a profile setting, the lights off feature would initiate automatically when a user clicks the play button of a video player.

The system can also use a profile of the user (or device or environment) that is derived from information obtained from the system. For example, the system can evaluate user selections in other user interface profiles, such as the default brightness of the operating system. In another example, the system evaluates the battery life of a mobile device to determine the level and conditions for dimming (e.g., dimming more and more often when battery level is low). In yet another example, the system uses environment information to control dimming, such as dimming more or less depending on ambient light or audio levels. In an alternative implementation, instead of (or in addition to) dimming the surrounding area or user interface, the system brightens the player area (or other area of focus). The user can counteract automated behavior as desired by clicking the player icon and adjusting settings.

In one implementation, the operation of turning the lights on/off has no bearing on any device, screen, or other settings. The operation is in relation to the content around a player in a specific environment. If the operation is on a website, then all content on the website or webpage surrounding the player is dimmed. Similarly, the remainder or elements of the user interface or display area available in an application or a tablet or mobile user interface can adjust or be adjusted (whether native or otherwise). In a second display environment, playback on one device can cause the user interface or display of the other device to dim or change. For example, a user selects a movie on a mobile device and requests playback on a nearby television using the mobile device. When the playback on the television begins, the user interface of the mobile device dims. In another implementation, the player can interact with the device to control device settings or to use aspects of the device operating system to adjust the display.

In one implementation, the player uses a dark transparent overlay to darken the surrounding areas or items. In another implementation, the player causes the entire screen (e.g., 120) to go to black (dark) and opens a new bright viewing window (e.g., 110) on top of the black screen. In yet another implementation, the surrounding area or items are not dimmed or brightened but are instead masked. For example, when a user clicks a mask button (or automatically on playback), the player creates a semi-transparent overlay to cover the surrounding items. Alternatively, one or more surrounding elements or images can be hidden (e.g., making a background image invisible). The overlay can include various images, such as a solid color, a pattern, an image or images or information related to the video, a user selected image or images, or advertising. In one example, the player causes a semi-transparent layer to surround the player window, and the layer includes a darkened version of poster art for the video being played (a movie).

In another implementation, the system contacts the content provider (of the content being played) for conditions on when to dim or replace the surrounding area and for what content to use (e.g., which image, poster art or advertising). Thus, in this implementation, the brightness and/or background display is adjusted based on the content (e.g., video) being played. For example, if the content includes an advertisement (or information, special effects, etc.) of a specific product (e.g., whose logo is red and blue), brightness, color, and/or design of the background is adjusted (to include the logo and/or colors red and blue). In an alternative implementation, the system outputs metadata based on the content being played so that the metadata can be used to control the brightness of physical surrounding or environment (e.g., a room where the user interface is located).

In yet another implementation, the system uses a profile to determine what to display in the surrounding area (e.g., displaying images selected as related to content in the user's content library, online or local). In one example, the system chooses content based on the action of the user. That is, displaying one content, color, and/or pattern while playing the content and displaying something else while paused, or related to the position of a user-controlled cursor in the player area or to the content displayed near that cursor.

Figure 2:
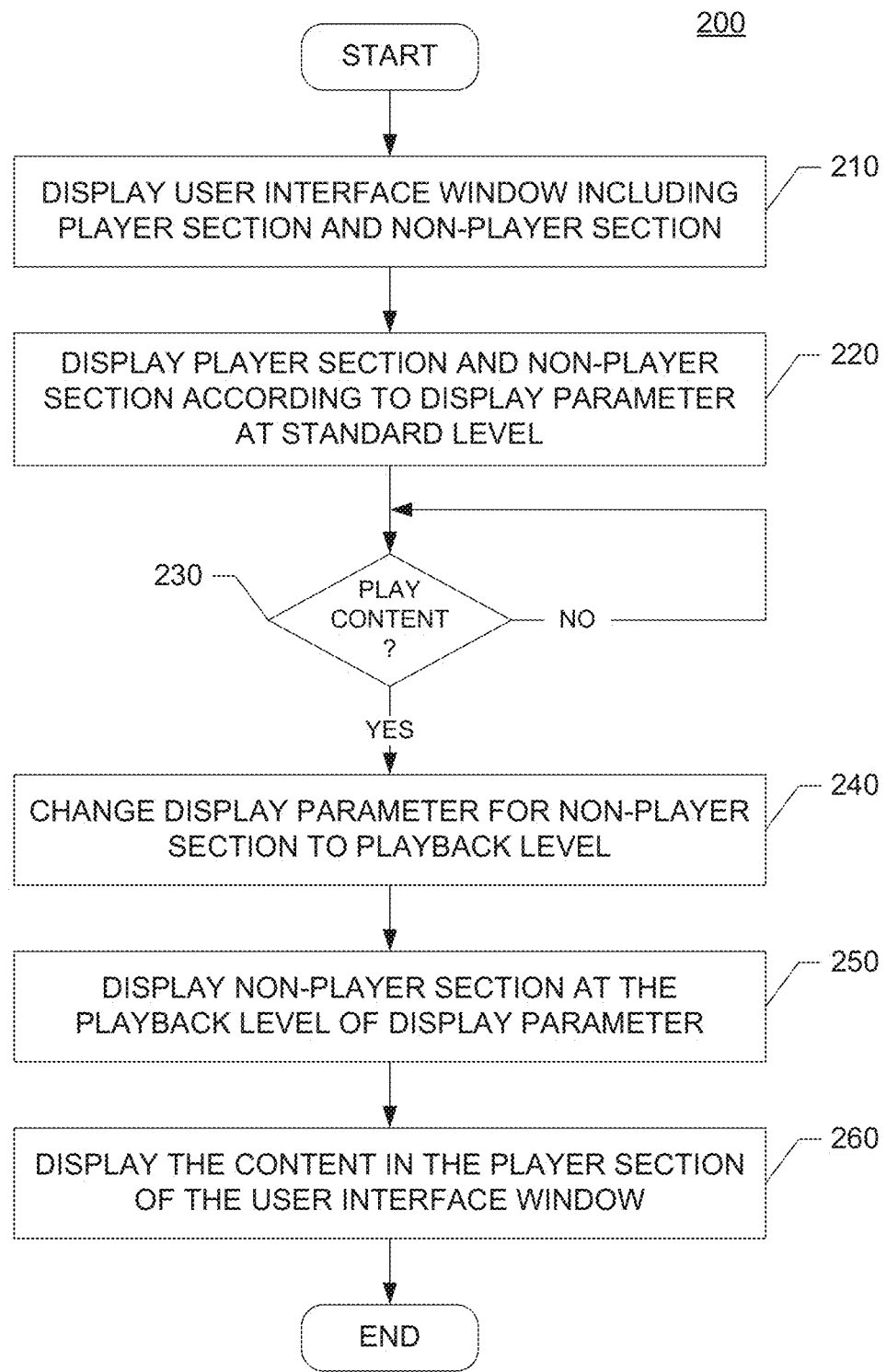
FIG. 2 is a flow diagram illustrating a method for adjusting a user interface and the area surrounding a presentation area displayed on a computer system in accordance with one implementation of the present invention.

FIG. 2 is a flow diagram 200 illustrating a method for adjusting a user interface and the area surrounding a presentation area displayed on a computer system in accordance with one implementation of the present invention. In one implementation, the method selectively adjusts the brightness of different areas within a display of the computer system. As stated above, the computer system also adjusts the display of the application and the surrounding user interface elements depending on the state of content playback. For example, in a network browser implementation, while accessing a page that contains a video player, a user-initiated action dims all items but the player on the page (lights off) or re-illuminates all items on the page (lights on).

In the illustrated implementation of FIG. 2, a window is displayed within a user interface, which is displayed on a display device, at box 210. The window may include a player section and a non-player section, wherein the player section includes an area for displaying multimedia content being played using a media player. The player section and the non-player section are displayed, at box 220, according to a display parameter at a "standard" level. In one implementation, the "standard" level refers to a defined level as set in device and/or screen settings for the display parameter. In one aspect, the display parameter is a brightness parameter. In another aspect, the display parameter includes a control parameter and data sent from the content provider. For example, the control parameter and the data sent from the content provider may correspond to the content (including, for example, an advertisement) being played in the player section. The control parameter may indicates that there is additional data being sent for display, such as a logo of the product being advertised in the content which can be displayed as a background in the non-player section.

A determination is made, at box 230, whether a play command for the multimedia content has been received. When the play command is received, the display parameter for the non-player section of the window is changed, at box 240, to a "playback" level. In one implementation, the "playback" level refers to a defined level for the display parameter, such as brightness, that is lower or dimmer than the "standard" level. However, in other implementations, the "playback" level may be higher, brighter, or just different than the "standard" level. Once the display parameter has been changed for the non-player section, the non-player section is displayed, at box 250, at the playback level of the display parameter. Further, the content is displayed in the player section of the window, at box 260.

As stated above, the changing of the display parameter for the non-player section of the window can be controlled using an "auto-dim" feature through user preferences or settings (or, e.g., at the device, account, manufacturer, provider level). The user can set the default to dimming to the "playback" level when the content begins or based on other user actions, selections, or events. If "auto-dim" is selected to be on in a profile setting, the lights off feature (i.e., dimming the display parameter to "playback level") would initiate automatically when a user clicks the play button of the video player.

Figure 3:
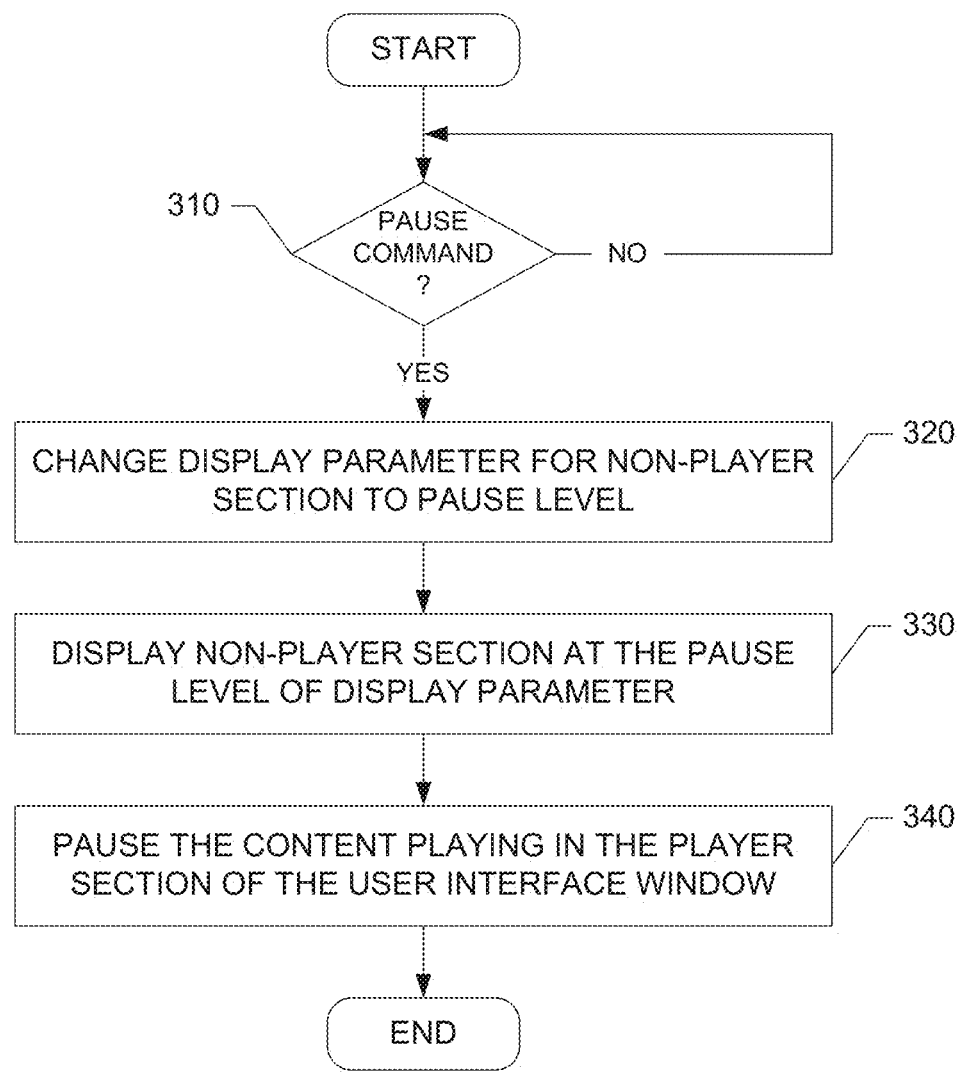
FIG. 3 is a flow diagram illustrating a method for adjusting a user interface and the area surrounding a presentation area displayed on a computer system in accordance with another implementation of the present invention.

FIG. 3 is a flow diagram 300 illustrating a method for adjusting a user interface and the area surrounding a presentation area displayed on a computer system in accordance with another implementation of the present invention. In the illustrated implementation of FIG. 3, the method includes determining, at box 310, whether a pause command has been received. When the pause command is received, the display parameter for the non-player section of the window is changed, at box 320, to a "pause" level. In one implementation, the "pause" level refers to a defined level for the display parameter, such as brightness, that is lower or dimmer than the "standard" level, but is higher or brighter than the "playback" level. In another implementation, the display parameter for the "pause" level is same as the "playback" level. As before, the user can set the operation when playback stops or is paused using user preferences or settings. Once the display parameter has been changed for the non-player section, the non-player section is displayed, at box 330, at the "pause" level of the display parameter. Further, the content playing in the player section of the window is paused, at box 340.

Figure 4:
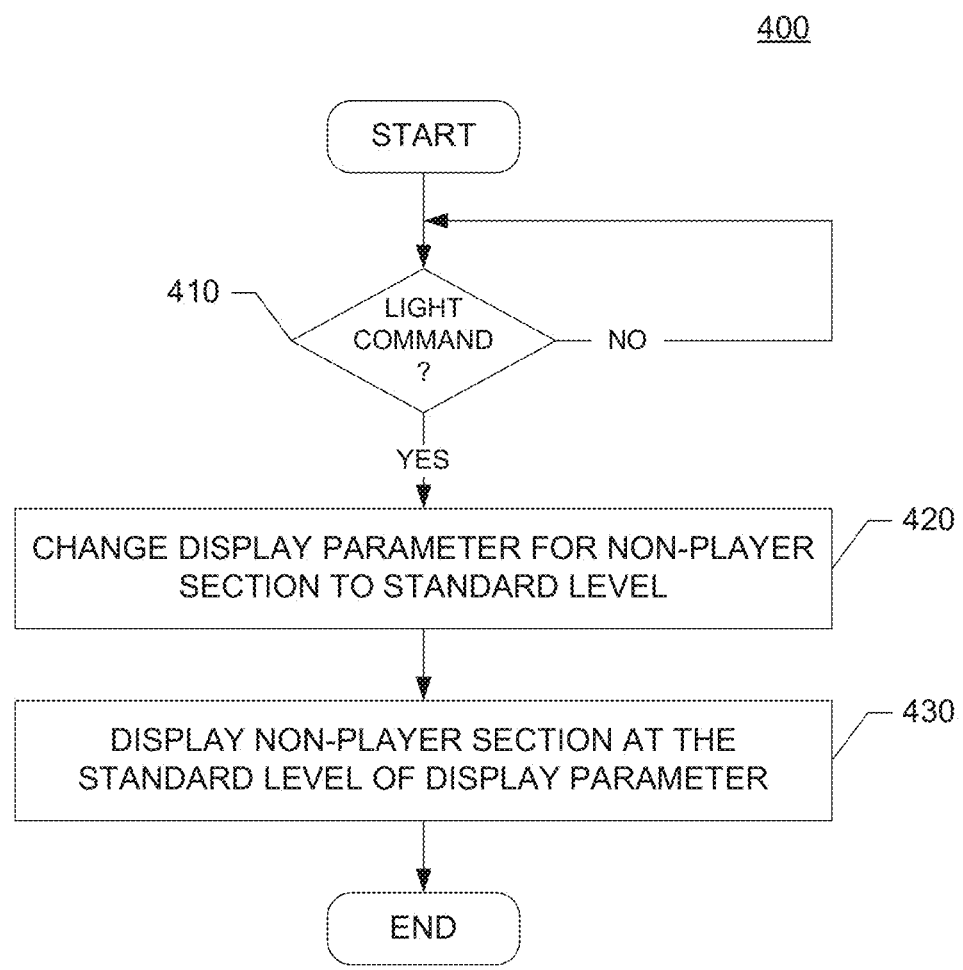
FIG. 4 is a flow diagram illustrating a method for adjusting a user interface and the area surrounding a presentation area displayed on a computer system in accordance with yet another implementation of the present invention.

FIG. 4 is a flow diagram 400 illustrating a method for adjusting a user interface and the area surrounding a presentation area displayed on a computer system in accordance with yet another implementation of the present invention. In the illustrated implementation of FIG. 4, the method includes determining, at box 410, whether a light command has been received. When the light command is received, the display parameter for the non-player section of the window is changed, at box 420, to a "standard" level. Once the display parameter has been changed for the non-player section, the non-player section is displayed, at box 430, at the "standard" level of the display parameter.

One implementation includes one or more programmable processors and corresponding computer system components to store and execute computer instructions, such as to provide the content playback and UI control, the condition controls, the profile evaluation, and the mask or overlay display selection and management.

As described above, implementations of the present invention include methods, apparatus, and storage medium to control a user interface in a computer system, including: displaying a window in a user interface displayed on a display device, wherein the window includes a player section and a non-player section, and the non-player section is displayed according to a display parameter at a standard level, wherein the standard level is a first level as set in a device setting for the display parameter; receiving a play command for content; changing the display parameter for the non-player section of the window to a playback level, wherein the playback level is a second level for the display parameter that is different than the first level; displaying the non-player section of the window according to the playback level of the display parameter; and displaying the content in the player section of the window. Implementations further include: displaying a window in a user interface displayed on a display device, wherein the window includes a player section and a non-player section, and the non-player section is displayed according to a display parameter at a first level defined in a device setting for the display parameter; receiving a command to change the display parameter of the non-player section; changing the display parameter for the non-player section of the window to a second level that is different than the standard level; displaying the non-player section of the window according to the second level of the display parameter; and displaying the content in the player section of the window. Implementations further include: a user interface configured to display a window, wherein the window includes a player section and a non-player section, and the non-player section is displayed according to a display parameter at a standard level, wherein the standard level is a first level as set in a device setting for the display parameter; a processor configured to change the display parameter for the non-player section of the window to a playback level when a play command for content is received, wherein the playback level is a second level for the display parameter that is different than the standard level, the processor operating to display the non-player section of the window according to the playback level of the display parameter and to display the content in the player section of the window. Implementations further include: receiving a pause command; changing the display parameter for the non-player section of the window to a pause level, wherein the pause level is a third level for the display parameter that is different than the standard level; displaying the non-player section of the window according to the pause level of the display parameter; and pausing the display of the content in the player section of the window. Implementations further include: receiving a light command; changing the display parameter for the non-player section of the window to the standard level; and displaying the non-player section of the window according to the standard level of the display parameter.

The foregoing methods, apparatus, and associated non-transitory storage medium are susceptible to many variations. Additionally, for clear and brief description, many descriptions of the methods, apparatus, and non-transitory storage medium have been simplified. Many descriptions use terminology and structures of specific standards. However, the disclosed methods, apparatus, and non-transitory storage medium are more broadly applicable.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules.

The above description of the disclosed implementations is provided to enable any person skilled in the art to make or use the invention. Various modifications to these implementations will be readily apparent to those skilled in the art, and the generic principles described herein can be applied to other embodiments without departing from the spirit or scope of the invention. For example, while the examples above focus on a video player, the dimming and brightening can apply to any software. For example, a user could dim the area surrounding a still image, a game, or a slide presentation (e.g., Microsoft PowerPoint), or an active window or panel in a music or audio platform, or a word processing or spreadsheet tool. In another example, the area surrounding a video editing window is dimmed during editing. Accordingly, the techniques are not limited to the specific examples described above. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for controlling lighting of sections of a window in a user interface screen in a computer system, comprising:
   displaying the window in a user interface screen displayed on a display device,
   wherein the window includes a video player section, a non-player section, and a display control icon, wherein the display control icon controls a display parameter for the non-player section, wherein the display parameter is a brightness parameter;
   displaying the non-player section according to the display parameter at a standard lighting level,
   wherein the standard lighting level is a first level as set in a device setting for the display parameter;
   receiving a play command for video content;
   changing the display parameter for the non-player section of the window to a playback lighting level in response to the received play command,
   wherein the playback lighting level is a second level for the display parameter that is different than the first level,
   wherein the display control icon is used to adjust the brightness of the playback lighting level;
   displaying the non-player section of the window according to the playback lighting level of the display parameter; and
   displaying the video content in the video player section of the window according to the standard lighting level of the display parameter.

2. The method of claim 1, wherein adjusting the brightness parameter causes displayed brightness of an image of the non-player section of the window to change.

3. The method of claim 1, wherein the playback lighting level for the brightness parameter is lower than the standard lighting level for the brightness parameter.

4. The method of claim 1, further comprising:
   receiving a pause command;
   changing the display parameter for the non-player section of the window to a pause level in response to the received pause command, wherein the pause level is a third level for the display parameter that is different than the standard lighting level;
displaying the non-player section of the window according to the pause level of the display parameter; and
pausing display of the video content in the player section of the window.

5. The method of claim 4, wherein the pause level for the brightness parameter is lower than the standard lighting level for the brightness parameter, but is higher than the playback lighting level for the brightness parameter.

6. The method of claim 1, further comprising:
receiving a light command;
changing the display parameter for the non-player section of the window to the standard lighting level in response to the received light command; and
displaying the non-player section of the window according to the standard lighting level of the display parameter.

7. The method of claim 1, wherein displaying the non-player section of the window according to the playback lighting level of the display parameter comprises
covering the non-player section of the window with a dark transparent overlay.

8. The method of claim 1, wherein displaying the non-player section of the window according to the playback lighting level of the display parameter comprises
receiving and displaying data received from a content provider in the non-player section of the window in which the data relates to the video content being displayed in the player section of the window.

9. A method for controlling lighting of sections of a window in a user interface screen in a computer system, comprising:
displaying a window in a user interface screen displayed on a display device,
wherein the window includes a video player section, a non-player section, and a display control icon, wherein the display control icon controls a display parameter for the non-player section, wherein the display parameter is a brightness parameter;
displaying the non-player section according to the display parameter at a first lighting level as set in a device setting for the display parameter;
receiving a play command for video content;
changing the display parameter for the non-player section of the window to a second lighting level that is different than the first lighting level in response to the received play command;
receiving a command to change the brightness of the second lighting level upon actuation of the display control icon;
displaying the non-player section of the window according to the second lighting level of the display parameter; and
displaying video content in the video player section of the window according to the first lighting level of the display parameter.

10. The method of claim 9, wherein
wherein the second lighting level of the display parameter is dimmer than the first lighting level of the display parameter.

11. The method of claim 9, wherein
wherein the second lighting level of the display parameter is adjusted in accordance with a battery life of the computer system.

12. The method of claim 9, wherein
wherein the second lighting level of the display parameter is adjusted in accordance with environment information including ambient light and audio levels.

13. An apparatus for adjusting a lighting level of a user interface screen and an area surrounding a presentation area within the user interface screen, the apparatus comprising:
a user interface screen configured to display a window,
wherein the window includes a video player section, a non-player section, and a display control icon,
wherein the non-player section is displayed according to a display parameter at a standard lighting level,
wherein the standard lighting level is a first brightness level as set in a device setting for the display parameter, and
wherein the display control icon controls the display parameter for the non-player section by adjusting the brightness of the standard lighting level; and
a processor configured to change the display parameter for the non-player section of the window to a playback lighting level when a play command for video content is received, wherein the playback lighting level is a second brightness level for the display parameter that is different than the standard lighting level, the processor operating to display the non-player section of the window according to the second brightness level of the playback lighting level of the display parameter and to display the video content in the video player section of the window at the first brightness level of the standard lighting level of the display parameter.

14. The apparatus of claim 13, wherein the display parameter of the non-player section of the window is changed by fading all items around the player section of the window using a dark transparent overlay.

15. A non-transitory storage medium storing a computer program to control lighting of sections of a window in a user interface screen, the computer program comprising executable instructions that cause a computer to:
display the window in a user interface screen displayed on a display device,
wherein the window includes a video player section, a non-player section, and a display control icon, wherein the display control icon controls a display parameter for the non-player section, wherein the display parameter is a brightness parameter;
display the non-player section according to the display parameter at a standard lighting level,
wherein the standard lighting level is a first level as set in a device setting for the display parameter;
receive a play command for video content;
change the display parameter for the non-player section of the window to a playback lighting level in response to the received play command,
wherein the playback lighting level is a second level for the display parameter that is different than the first level,
wherein the display control icon is used to adjust the brightness of the playback lighting level;
display the non-player section of the window according to the playback lighting level of the display parameter; and
display the video content in the video player section of the window according to the standard lighting level of the display parameter.

16. The non-transitory storage medium of claim 15, further comprising executable instructions that cause the computer to:

receive a pause command;
change the display parameter for the non-player section of the window to a pause level in response to the received pause command,
wherein the pause level is a third level for the display parameter that is different than the standard lighting level;
display the non-player section of the window according to the pause level of the display parameter; and
pause the display of video content in the player section of the window.

17. The non-transitory storage medium of claim 15, further comprising executable instructions that cause the computer to:
receive a light command;
change the display parameter for the non-player section of the window to the standard lighting level in response to the received light command; and
display the non-player section of the window according to the standard lighting level of the display parameter.

* * * * *